3 Sheets—Sheet 1.

A. STOLER.
COMBINED REEL AND RAKE FOR HARVESTERS.

No. 171,188. Patented Dec. 14, 1875.

Witnesses: S. J. Van Stavoren, Jos. P. Connolly

Inventor: Abraham Stoler
Connolly Bros, Attorneys

3 Sheets—Sheet 2.

A. STOLER.
COMBINED REEL AND RAKE FOR HARVESTERS.

No. 171,188. Patented Dec. 14, 1875.

Witnesses
S. J. Van Stavoren
J. B. Connolly

Inventor
Abraham Stoler
By Connolly Bros, Attorneys

3 Sheets—Sheet 3.
A. STOLER.
COMBINED REEL AND RAKE FOR HARVESTERS.
No. 171,188.   Patented Dec. 14, 1875.
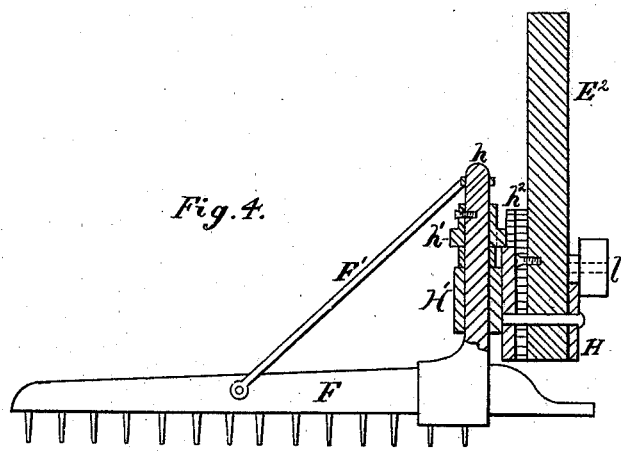
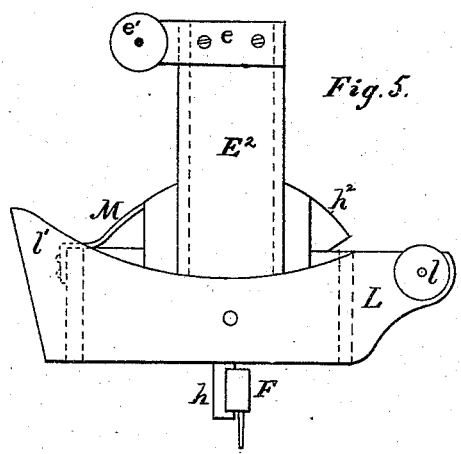 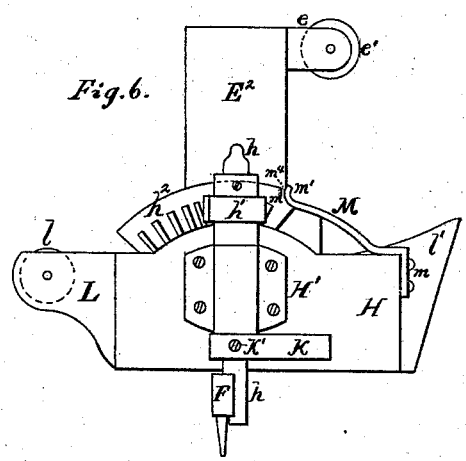
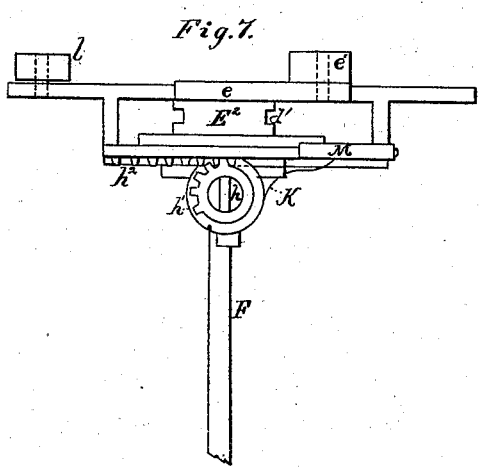
Witnesses
S. J. Van Stavoren
Jos. P. Connolly
Inventor
Abraham Stoler
By Connolly Bros, Attorneys
N. PETERS, PHOTO-LITHOGRAPHER, WASHINGTON, D. C.

UNITED STATES PATENT OFFICE.

ABRAHAM STOLER, OF PHILADELPHIA, PENNSYLVANIA.

IMPROVEMENT IN COMBINED REELS AND RAKES FOR HARVESTERS.

Specification forming part of Letters Patent No. 171,188, dated December 14, 1875; application filed June 12, 1875.

*To all whom it may concern:*

Be it known that I, ABRAHAM STOLER, of Philadelphia, in the county of Philadelphia and State of Pennsylvania, have invented certain new and useful Improvements in Combined Reel and Rake for Harvesters; and I do hereby declare the following to be a full, clear, and exact description of the invention, such as will enable others skilled in the art to which it pertains to make and use it, reference being had to the accompanying drawings, which form part of this specification, in which—

Figure 1:
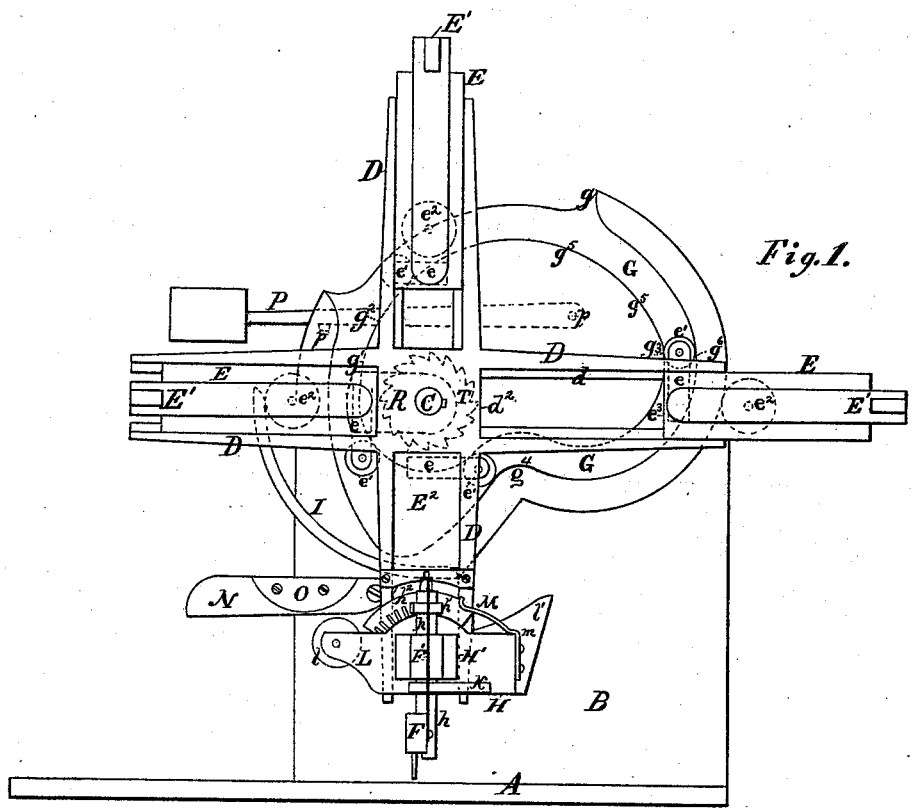
Figure 2:
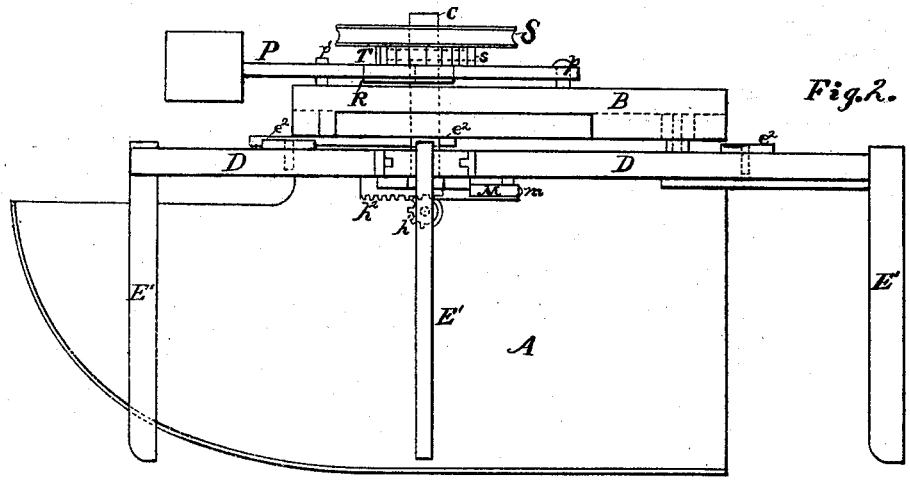
Figure 3:
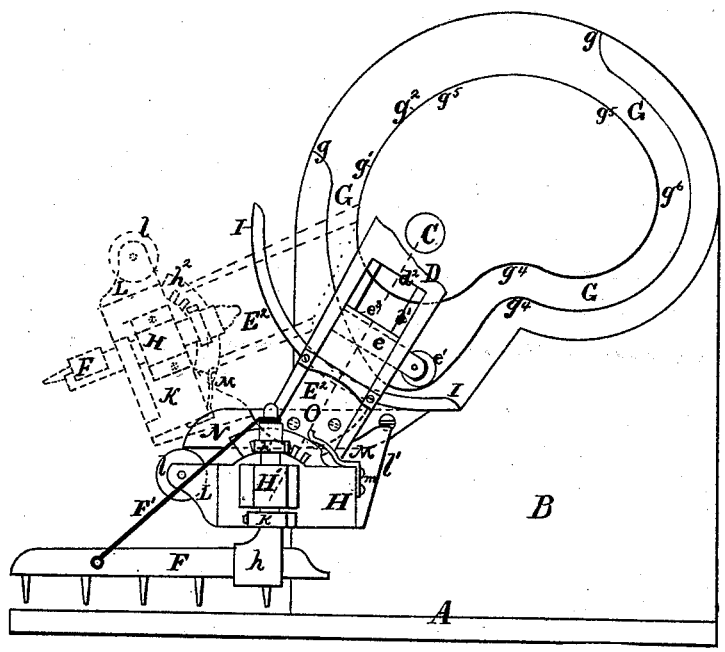

Figure 1 is a front elevation. Fig. 2 is a plan. Fig. 3 is a front elevation, showing two different positions of the rake-beam. Figs. 4, 5, 6, and 7 are detail views of the rake, Fig. 4 being a broken vertical section, Figs. 5 and 6 back and front elevation, and Fig. 7 a plan.

The object of my invention is to provide a combined harvester reel and rake, in which the arms of the reel shall be extensible, so as to project a considerable distance over the standing grain, and then draw up a suitable distance above the platform, in order to avoid dragging the cut grain thereon, and in which, also, the rake, which is attached to or forms one of the reel-arms, shall sweep in a direct line over, and also make a quarter turn upon, the platform, so as to lay the cut grain on the ground in a line parallel with the track of the machine. A further object of my invention is to provide means for counterbalancing the rake when projected over the standing grain, so as to prevent it from dropping too heavily, or from falling at all, when the rake is in a horizontal forward position.

The nature of my invention consists in the novel construction, combination, and arrangement of parts, as hereinafter fully described.

Referring to the accompanying drawing, A represents the platform of a harvester constructed in the usual or any suitable manner, and B an arbor or standard for supporting the reel, rake, and operating mechanism. C represents the reel-shaft, to which is rigidly attached a hub, D', from which proceed four rigid radial arms, D D D D, having tongues $d'\ d'\ d'\ d'$. E, E, E, and $E^2$ are sliding bars, having grooves to match with the tongues $d'\ d'\ d'\ d'$. $E^1\ E^1\ E^1$ are the reel-beaters, and F the rake-beam attached to these sliding bars or arms. To each of the sliding arms E and to $E^2$ is attached a short transverse bar, $e$, on which is mounted a roller, $e^1$, and on each of said arms, except $E^2$, is another roller, $e^2$, the object of said rollers being, in conjunction with cams or ellipses, hereinafter described, to cause said arms to slide out, so as to make the beaters $E^1$ and rake-beam F to project over and sweep in the standing grain, and then to rise a sufficient distance to fully clear the cut grain on the platform. G represents an ellipse or cam-groove, in which the rollers $e^1\ e^1$ move, said groove, if desired, being open or cut away at the top or between the points $g\ g$, so as to permit the sliding arms E and $E^2$ to be removed or drawn out from the rigid arms D in case of breakage, or when for any reason it may be desired to remove said sliding arms. This groove, cam, or ellipse G is made so as that any one of the rollers $e^1$ moving in or upon it will begin, when just back of a line drawn vertically through the reel-shaft, to recede from the center of the reel, and will continue its recession gradually until it has attained a position forward of the shaft C, in a line horizontal therewith, when it will begin to approach the center, this approach being gradual, continuous, and uniform until the arm to which said roller is attached is in a vertical line over the platform. From this latter point the roller $e^1$ moves concentric with the shaft C until it again begins its recession from the center, as already mentioned; or, in other words, the roller $e^1$ of any one of the reel-arms, E, E, E, or $E^2$, moving on the cam G, begins, at or about the point $g^2$, to draw away from the shaft C, and continues gradually, so as to recede until it comes to or about the point $g^3$, the effect being that the arm E or $E^2$, to which it is secured, is gradually slid out or extended upon the arm D, and caused to project a considerable distance over the standing grain. From the point $g^3$ the roller $e^1$, moving against the cam or in the groove G, is caused to gradually approach the shaft C until the point $g^4$ is reached, thus sliding the arm E or $E^2$ in upon the arm D till its end $e^3$ strikes against the shoulder $d^2$, and causing the beater $E^1$ or rake-beam F to be elevated a sufficient distance above the platform A. The rollers $e^1$ in moving outwardly from the center shaft C impinge upon the inner side $g^5$ of the groove G. From the point $g^6$ to $g^4$ they travel on the outer edge. From $g^4$ to $g^1$ they do not impinge or move absolutely against either the outer or inner edge of said groove, which is cut away for a purpose, in connection with the rake-arm, hereinafter more fully described. The object of attaching the rollers $e^1$ to transverse bars $e$, instead of directly to the arms E, is to throw said rollers out of the line of said arms, thereby affording a leverage, and preventing the rollers from binding on the cam or in the groove G, or coming to a dead-center, which this arrangement effectually prevents. I represents a curved track or segment, concentric with the shaft C, and so arranged that the roller $e^2$ will begin to ride upon it at the precise moment the roller $e^1$ comes to the point $g^4$, and will continue to ride upon it until the roller $e^1$ comes to the point $g^1$, thus serving to keep the arm E slided in on the arm D until its extension is needed to begin, as already described.

I will now proceed to described the construction of the rake, remarking, first, that its functions and operation in the movement of its roller $e^1$ from the point $g^1$ to the point $g^4$ are the same as those of the other reel arms and beaters, its arm $E^2$ being slided out and drawn in by the action of the said roller $e'$ on the cam or elliptical groove G, as are the arms E. H is a cradle, pivoted on the end of the arm $E^2$, and supporting in a box or sleeve, H', a shaft, $h$, in line with said arm. To the shaft $h$ is secured a pinion or toothed collar, $h^1$, meshing with a cogged segment, $h^2$, fastened to the outside of the arm $E^2$ just above the cradle H. The rake-beam F is secured to the lower extremity of the shaft $h$, which is flattened out and recessed for that purpose, a brace or rod, F', proceeding, if desired, from the middle of the beam F to the upper end of the shaft $h$. K is a dog, securely fastened to the shaft $h$ at or about at right angles to the beam F by means of a set-screw, K'. L is an ear on the cradle H, bearing the roller $l$, and $l'$ an upward projecting piece on the opposite extremity of said cradle. M is a spring, firmly fastened at its end $m$ to the cradle H, its free end $m'$, which has a slight curl or bend upward, as, shown, resting on the upper edge of the back of the segment $h^2$. N and O are cam-guides, the first of which is rigidly attached to the arbor or standard B, the latter or guide O being secured to the former or guide N. If desired, both guides or cams may be formed or cast in one solid piece.

The operation of the rake is as follows: The beam F, as the shaft C revolves, sweeps transversely in a direct line over the platform A until the roller $l$ meets the under side of the guide N. As the roller $l$ passes along under the said guide, the arm $E^2$ is drawn out gradually, the pivotal connection of said arm and cradle permitting the latter to keep in the same plane or parallel with and just above the platform A. The arm $E^2$, as it moves, changing its angle with reference to the cradle H, causes the segment $h^2$, which is attached to said arm, to give motion to the pinion $h^1$, thereby causing the shaft $h$ to rotate and the beam F to sweep around a quarter turn and rake the cut grain off the platform and lay it on the ground in the rear of the machine in a line parallel with the track. The arm $E^2$ continues to extend and turn until the roller $l$ has passed the farther end of the shoe N, at which moment the part $l'$ of the cradle H strikes or passes under the shoe O, causing said cradle to rock back to its normal attitude, rotating the shaft $h$ backwardly, and restoring the beam F to its transverse position with reference to the platform A, the dog K preventing said beam from going further. As soon as said beam has assumed this position, the end $m^1$ of the spring M (which in the rocking motion of the cradle moved along the top of the segment $h^2$) drops into the recess $m^3$, and, by impinging against the shoulder $m^4$, keeps the beam F in this transverse position until the roller $l$ at the next revolution of the shaft C passes beneath the shoe N.

The object of cutting away the groove G contiguous to the segment I instead of continuing it in a true circle, described from the shaft C as a center from the point $g^4$ to $g^1$ is, as will be readily perceived, to permit the roller $e^1$ on the arm $E^2$ to drop and allow the said arm $E^2$ to be extended when the rake makes the quarter turn on the platform, as already described.

In order to prevent the rake, when forward, to descend with too much force, or to drop by gravity when the machine should come to a stop with the beam F over the standing grain, I provide a weighted brake-lever P, hinged at $p$. On the shaft C is placed a fixed eccentric, R, on the periphery of which the lever P heavily impinges, when the rake is in the described forward position. When the rake is not in this forward position the short radii of the eccentric R points upwardly, so that the lever P does not then impinge upon the periphery of the said eccentric, thus avoiding friction or brake action against the shaft C, except when needed to counterbalance the rake. When not braking the shaft C, as described, the lever P is sustained upon the pin or stud $p'$ projecting from the standard B. Motion is communicated to the shaft C by means of a loose pulley, S, having a spring-pawl, $s$, which engages on the forward motion of said pulley with a ratchet, T, fast on said shaft. On the backward motion of the pulley the pawl $s$ slides over the ratchet T, thereby preventing the rake from being revolved except in one direction.

I claim—

1. In combination with the extensible arms E E and segment I, the rollers $e^2$, for preventing the extension of said arms when rising from the platform, substantially as shown and described.

2. In combination, with the extensible arm $E^2$, bearing the segmental rack $h^2$, the pivoted cradle H, sustaining the shaft $h$, holding the pinion $h^1$, substantially as shown and described.

3. In combination with the cradle H, pivoted on the extensible arm $E^2$, the cam-guide N for holding down said cradle, and producing an extension of said arm, substantially as shown and described.

4. In combination with the pivoted cradle H, having the upwardly-projecting end $l'$, the cam-guide O, for restoring the beam F to its transverse position with reference to the platform A, substantially as set forth.

5. In combination with the pivoted cradle H, pinion and fixed segmental rack $h^2$, formed with recess $m^3$, the spring M for holding the beam F in a position transversely to the platform A, substantially as shown and described.

6. In combination with the extensible arm of a harvester-reel, a rake, constructed and arranged substantially as described, so as to make a straight and quarter turn sweep over the platform, as set forth.

7. A combined harvester reel and rake, having extensible arms constructed and arranged substantially as described, so as to project over the standing grain and draw up to clear the platform in their transit over it, one of said extensible arms being provided with a rake-beam, so constructed and arranged as to make a straight and quarter turn sweep, substantially as shown and described.

8. In combination with the reel-rake shaft C, bearing the eccentric R, the weighted brake-lever P, substantially as shown and described.

9. In combination with the extensible arms E or $E^2$, the rollers $e^1$, borne on the transverse bars $e$ out of true line of said arms, so as to afford leverage and prevent binding, as set forth.

In testimony that I claim the foregoing I have hereunto set my hand this 7th day of June, 1875.

ABRAHAM STOLER.

Witnesses:
 M. DANL. CONNOLLY,
 CHAS. F. VAN HORN.